(12) United States Patent
Le Rouzic et al.

(10) Patent No.: US 8,737,422 B2
(45) Date of Patent: May 27, 2014

(54) METHOD FOR PROCESSING A RESOURCE RESERVATION REQUEST AND RELATED DEVICE AND NODE DEVICE

(75) Inventors: Esther Le Rouzic, Trébeurden (FR); Sebastien Jobert, Begard (FR)

(73) Assignee: France Telecom, Paris (FR)

( * ) Notice: Subject to any disclaimer, the term of this patent is extended or adjusted under 35 U.S.C. 154(b) by 79 days.

(21) Appl. No.: 13/380,987

(22) PCT Filed: Jun. 29, 2010

(86) PCT No.: PCT/FR2010/051348
§ 371 (c)(1),
(2), (4) Date: Dec. 27, 2011

(87) PCT Pub. No.: WO2011/001098
PCT Pub. Date: Jan. 6, 2011

(65) Prior Publication Data
US 2012/0106955 A1    May 3, 2012

(30) Foreign Application Priority Data
Jun. 30, 2009    (FR) ..................... 09 54453

(51) Int. Cl.
| H04L 12/28 | (2006.01) |
|---|---|
| H04B 7/212 | (2006.01) |
| H04J 14/00 | (2006.01) |
| H04Q 11/00 | (2006.01) |
| H04W 28/26 | (2009.01) |

(52) U.S. Cl.
CPC ........ *H04L 12/2801* (2013.01); *H04Q 11/0066* (2013.01); *H04W 28/26* (2013.01)
USPC .............. 370/443; 718/104; 718/105; 398/45

(58) Field of Classification Search
CPC  H04L 12/2801; H04L 28/26; H04W 72/0446
USPC ............ 370/351–463; 718/100–105; 398/45; 709/223–228
See application file for complete search history.

(56) References Cited

U.S. PATENT DOCUMENTS
2004/0040025 A1 *  2/2004  Lehtinen ....................... 718/104

OTHER PUBLICATIONS

Yoo et al. "A High Speed Protocol for Bursty Traffic in Optiical Networks", Proceedings of the SPIE, 11/2, 1997, pp. 79-90 XP008041027.*

(Continued)

*Primary Examiner* — Afsar M Qureshi
(74) *Attorney, Agent, or Firm* — David D. Brush; Westman, Champlin & Koehler, P.A.

(57) ABSTRACT

A method and apparatus are provided for processing a delayed resource reservation request in an optical telecommunication network for transferring data between a source device and a destination device, wherein the control plane is different from the transfer plane. Upon a node device of the network receiving the resource reservation request sent from the source device to the destination device via a path including at least one node device, the request containing at least one first parameter relating to the start of the connection at the source device, the method includes the following steps: obtaining information relating to a signal transfer time via the path up to an upstream node device; updating the information by adding a signal transfer time at the intermediate equipment; and calculating a date for the start of the resource reservation at the node device using the value of the first received parameter and the information.

13 Claims, 6 Drawing Sheets (56) References Cited

OTHER PUBLICATIONS

International Search Report and Written Opinion dated Nov. 24, 2010 for corresponding International Application No. PCT/FR2010/051348, filed Jun. 29, 2010.

Yoo et al., "A High Speed Protocol for Bursty Traffic in Optical Networks", Proceedings of the SPIE—The International Society for Optical Engineering, SPIE, US, vol. 3230, Nov. 2, 1997, pp. 79-90, XP008041027.

Zhou Lan et al., "Performance of Distributed Control Protocol for WR-OBS Systems", Communications, 2004 and the 5th International Symposium on Multi-Dimensional Mobile Communications Proceedings. The 2004 Joint Conference on Beijing, China Aug. 29-Sep. 1, 2004, Piscataway, NJ, USA, IEEE, US, vol. 2, Aug. 20, 2004, pp. 522-526, XP010765014.

Ovadia et al., "Photonic Burst Switching (PBS) Architecture for Hop and Span-Constrained Optical Networks" IEEE Communications Magazine, IEEE Service Center, Piscataway, US, vol. 41, No. 11, Nov. 1, 2003, pp. S24-S32, XP001185181.

Qiao, "Labeled Optical Burst Switching for IP-over-WDM Integration" IEEE Communications Magazine, IEEE Service Center, Piscataway, US, vol. 38, No. 9, Sep. 1, 2000, pp. 104-114, XP011091349.

International Preliminary Report on Patentability and English translation of the Written Opinion dated Jan. 17, 2012 for corresponding International Application No. PCT/FR2010/051348, filed Jun. 29, 2010.

Kong et al., "Improved Dynamic Lightpath Provisioning for Large Wavelength-Division Multiplexed Backbones", Journal of Lightwave Technology, vol. 25, No. 7, Jul. 2007, pp. 1693-1701.

\* cited by examiner

METHOD FOR PROCESSING A RESOURCE RESERVATION REQUEST AND RELATED DEVICE AND NODE DEVICE

CROSS-REFERENCE TO RELATED APPLICATIONS

This application is a Section 371 National Stage Application of International Application No. PCT/FR2010/051348, filed Jun. 29, 2010, which is incorporated by reference in its entirety and published as WO 2011/001098 on Jan. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of telecommunications, and more particularly of the optical telecommunication networks implementing circuit switching.

The present disclosure relates to a delayed resource reservation method. It also relates to a node element of an optical telecommunication network implementing such a method.

BACKGROUND OF THE DISCLOSURE

The current optical circuit switching (OCS) techniques are based on a reservation of the resources prior to the sending of the data. Resource reservation methods have been specified by standardization bodies such as the IETF in the specification of the GMPLS (Generalized Multi-Protocol Label Switching) control protocol or the ITU within the ASON (Automatically Switched Optical Network) control plane.

The reservation can, for example, be made as follows: the reservation of resources in each node of the connection is initiated at a source node on reception of a connection set-up request. The reservation relies on a signaling mechanism implemented using a signaling protocol. This mechanism consists in sending a reservation request message ("set-up") from the source node to the destination node and then returning a reception acknowledgement message from the destination node to the source node along the same path as in the outbound direction. On reception of the reception acknowledgement at the source node, the connection is set up and the data are transferred to the destination node over this connection. The resources available for the current connection are identified in each node as the reservation request message passes through each node. This information can be collected by the reservation request message.

The choice of the connection route (succession of the nodes ABCD) can be made by the source node. In this case, the source node must implement a routing algorithm on the basis of the topology that it will have worked out from other control messages (routing protocol) for example. The explicit route must then be indicated in the reservation request and reception acknowledgement messages in order for the nodes receiving these messages to know where said messages have to be transferred to. The choice of the connection route (succession of the nodes ABCD) can also be made hop by hop, each node computing the next jump on the basis of its knowledge of the topology. In this case, the request messages must contain the destination node and update the route so that the reception acknowledgement message correctly uses the same nodes as in the outbound direction (a combination of the two solutions is also possible).

Figure 2:
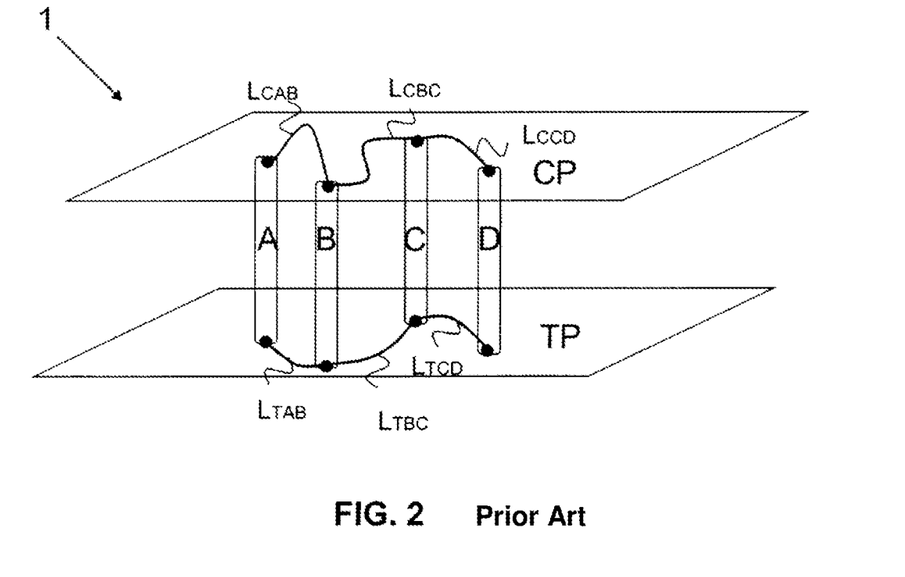
FIG. 2 illustrates a control plane and a transfer plane of a circuit-switched telecommunication network according to the prior art.

In order to correctly separate the control processes of the network from the connection creation processes on the optical layer, the control plane and transfer plane formalism is conventionally used. Such a formalism is schematically represented in FIG. 2. A telecommunication network 1 comprises node elements A, B, C and D interlinked by optical links. Each node is present both in the transfer plane TP, because of the optical resources that it controls, and in the control plane CP, because it has functions that make it possible to understand and process the messages from the control plane.

The signaling messages are exchanged over the control plane CP whereas the resources are reserved in the transfer plane TP. As schematically represented in FIG. 2, the physical media $L_{cAB}$, $L_{CBC}$, $L_{CCD}$ of the control plane CP are not necessarily identical to those $L_{TAB}$, $L_{TBC}$, $L_{TCD}$ of the transfer plane TP. In other words, a control link between two nodes does not necessarily pass through the same optical fiber medium as the link of the transfer plane. Furthermore, the nodes do not necessarily have knowledge of the respective physical media of the links of the control plane and of the transfer plane.

The reservation of the resources by exchanges of messages from node to node make it possible to distribute the control of the optical layer in each node (distributed case), unlike the case where the reservation request and reception acknowledgement messages are sent and received by a single centralized entity (centralized case). The reservation of the resources can be performed in the nodes on the basis of the availability of the resources on reception of the reservation request messages (outbound reservation) or of the reception acknowledgement messages (return reservation).

Figure 1A:
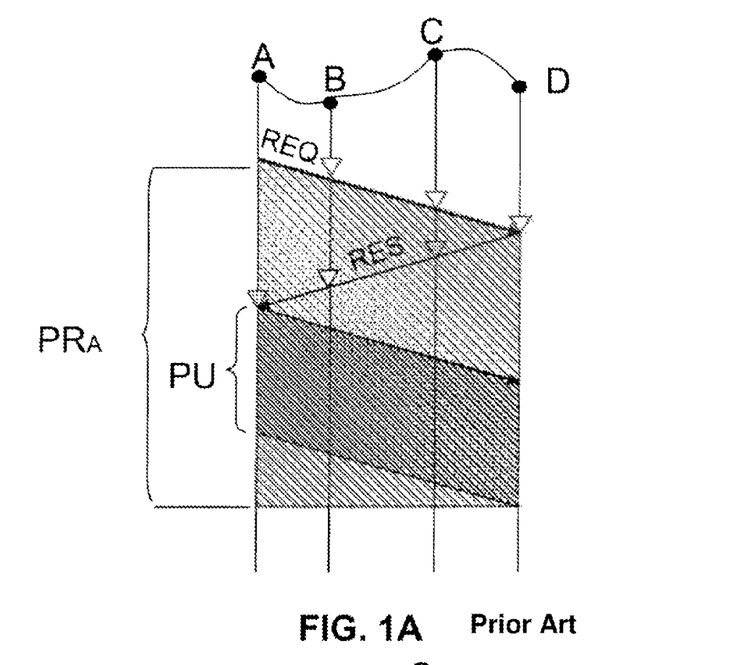
FIGS. 1A and 1B respectively illustrate the principles of the outbound and return reservation according to the prior art.
Figure 1B:
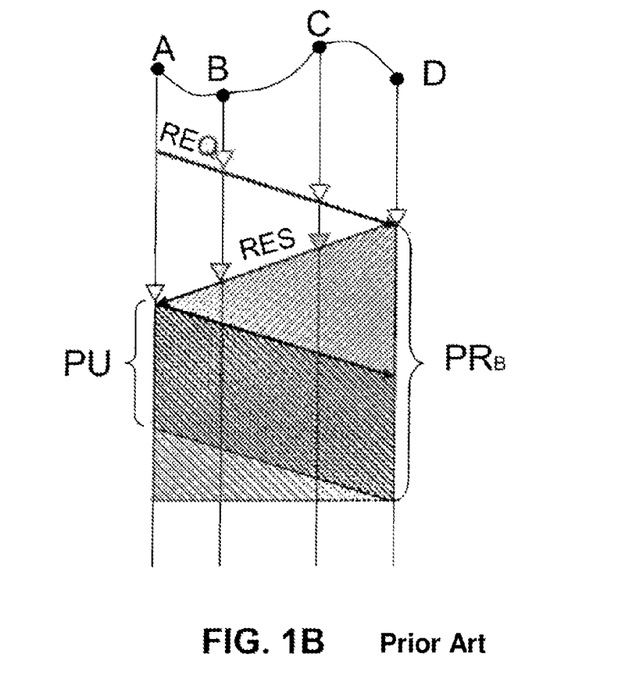

Concerning FIGS. 1A and 1B, a route ABCD of an optical network 1 determined by the control plane of a telecommunication network 1 is considered. In order to transfer data from a node element A to a node element D, the node element A sends a signaling message comprising a reservation request REQ to the node element D via the path ABCD. FIG. 1A illustrates the case of a reservation in the outbound direction, according to which the nodes of the path ABCD initiate the reservation on reception of the reservation request message REQ. The destination node element D sends a signaling message RES to the source element A indicating that the reservation is effective. This message RES is received and retransmitted by all the intermediate nodes. The resources will then be released only on reception of a signaling message requesting the release of the resources. A period PU is then considered which corresponds to the useful period during which the resources are used for the transfer of the data and a reservation period PR corresponding to the total period during which the resources are reserved by the nodes of the path ABCD in order to transfer these data. It has been found that the data reservation time $PR_A$ is much greater than the useful reservation time and that the unnecessary reservation time is not negligible, in particular in the case where the useful period PU is of an order of magnitude similar to the signaling time. It will be noted that this unnecessary reservation time is all the greater when the data transfer time approximates to a signaling time, that is to say, a time encompassing the request processing times by the node elements on the route ABCD and the request propagation times over the optical links between the node elements A, B, C and D.

FIG. 1B illustrates the case of a return reservation, which means that the nodes that make up the route ABCD make the resource reservation effective only on reception of a reception acknowledgement message RES sent by the destination node element D in response to the request REQ. The result of this is that the reservation period $PR_B$ is less than the time $PR_A$ and therefore that the unnecessary reservation time is shorter.

In both cases, the reservation of the resources is effective before the start of the transfer of the data over the route ABCD, which leads to an occupancy of the resources during a period in which no traffic uses them. Similarly, the resources are released only after the reception of a release message, and the nodes managing their resources have not a priori indication concerning the moment when this message will arrive. In the case where the data propagation time approximates to the signaling time, these "unnecessary" reservation times are not negligible and limit the speed of sequencing of the reservations.

As a result, the current resource reservation techniques are poorly suited to a dynamic traffic consisting of a succession of short and frequent reservation periods. In such a context, it could prove useful to set up the connections on the basis of the requirements, whether in the network core or at a terminal element.

To improve the situation, the principle of reserving the resources in a delayed manner for a determined time ("Just Enough Time") has been described in the prior art, in particular in the document entitled "Improved Dynamic Lightpath Provisioning For Large Wavelength Division Multiplexed Backbones", by H. Kong and C. Phillips, in the Journal of Lightwave Technologies review, vol. 25, No. 7, pp. 1693-1701, in 2007. However, such a document does not explicitly describe how to compute the useful delay to be taken into account at each node element.

SUMMARY

An embodiment of the invention relates to a method for processing a delayed resource reservation request to set up a connection in an optical telecommunication network between a source element and a destination element, both connected to said network, the control plane being different from the transfer plane.

According to an embodiment of the invention, such a method is particular in that it comprises, on reception by a node element of the network of the resource reservation request from the source element and addressed to the destination element via a route including at least one node element, said request comprising at least one first parameter relating to a start of connection at the source element, the following steps:
  obtaining information relating to a transfer time of a signal via said route to a node element upstream of said node element on the route,
  updating said information by adding a transfer time at said intermediate element, and
  computing a resource reservation start time at the node element from the value of said first received parameter and said information obtained.

The method according to an embodiment of the invention is implemented in the control plane of the telecommunication network concerned, that is to say that the implementation of the delayed reservation is based on the content of signaling messages received by the node element from an upstream node element on the route chosen to set up the connection and transfer useful data.

The term "transfer time" should be understood to mean a duration comprising at least the time necessary for the propagation of the request in the control plane or of data in the transfer plane and/or the reservation request processing time by the node elements of the route chosen to link the source element to the destination element.

Among the information contained in this reservation request, an intermediate node element placed on said route obtains at least one information item making it possible to determine the connection start time at the source node element.

With an embodiment of the invention, an intermediate node element can derive its own resource reservation start time from the essential information that it receives in the request or that it obtains otherwise.

An embodiment of the invention therefore proposes a novel and inventive resource reservation approach which enables a node element of the signaling route to compute the start and end instants of the requested reservation and therefore use its resources optimally. It therefore offers a technical solution for implementing the "Just Enough Time" reservation principle.

Advantageously, the request also comprises the desired connection duration. This duration notably enables the node element to estimate the connection end time and therefore the resource reservation end time.

According to one aspect of an embodiment of the invention, the information relating to a transfer time is obtained in a second parameter of the received request.

One advantage is to provide the node element with information relating to the optical transfer time upstream of the node element and avoid it having to perform operations to recover this information from one or more sources.

According to another aspect of an embodiment of the invention, when the node element is an intermediate node element, said method comprises a step for sending the request to a downstream node element on said route, said request comprising the updated value of said information in the second parameter.

The parameter comprising the information relating to the transfer time is therefore updated by each intermediate node element and the new value is inserted into the reservation request before it is sent to the downstream node element. One advantage is that the downstream node has updated information from which it can accurately compute its own reservation start time.

According to another aspect of an embodiment of the invention, when the node elements of the network are synchronized in time, the first parameter comprises a reservation start time for the source element and the step for computing a resource reservation time at the node element comprises the addition of the value of said information and of the value of the first parameter.

When the node elements are synchronized in time, they all have a common time reference. Advantageously, the first parameter relating to a connection start is therefore a connection start time. In order to know its own connection, and therefore reservation, start time, the intermediate node element adds to it a transfer time over the route from the source element to it, that it can deduce from the information that it has obtained and from any computations that it has carried out previously.

According to another aspect of an embodiment of the invention, when the node elements of the network are not synchronized in time, the first parameter is a waiting time before the reservation start time for the source element and the step for computing a resource reservation time at the node element comprises the subtraction of the updated value of said information from a time of reception of the request by the intermediate node element plus the value of the first parameter.

In this case, the node elements on the route taken by the request do not have a common time reference. There is therefore no point in them transmitting a connection start time for the source node element. The waiting time for the source element can, on the other hand, be added to a time of reception of the request after subtraction of the transfer time-related information obtained.

It will be noted that, although the literature seems to take it as read that the optical node elements are synchronized in time for the reservation of resources, the level of precision required for the targeted connection durations (from a millisecond to a second) makes the synchronization of the nodes difficult to achieve with the current techniques. One advantage of an embodiment of the invention is therefore to take into account this difficulty and to propose a simple and reliable solution for circumventing it.

According to another aspect of an embodiment of the invention, the information relating to a transfer time comprises a term relating to an aggregate of propagation times via said route to the upstream node element and the updating of this information comprises an addition of the propagation time between the upstream node element and the intermediate node element to the received value of said parameter.

One advantage of an embodiment of the invention is to take account of the propagation times over the optical links between the nodes. This may relate to the propagation times of the request in the control plane or of the data in the transfer plane.

It will be understood that this aspect of an embodiment of the invention is particularly advantageous because the transfer plane and the control plane do not use the same fiber medium to link the node elements A, B, C and D of the route chosen in order to set up the connection.

Advantageously, said term of said information comprises a difference between an aggregate of the propagation times of the request and the aggregate of the propagation times of the data to the upstream node element.

This term is particularly useful in the case where not only the fiber medium used in the control plane to route the reservation request differs from that used in the transfer plane to route the data to be transmitted, but also the node elements are not synchronized in time. In this configuration in fact, the node element does not have access to a connection start time at the source element to which to refer and that it can use as point of departure for computing its own reservation time.

The information thus makes it possible to ensure a reliable and accurate estimation of the resource reservation start time at an intermediate node element by taking into account such a difference.

According to another aspect of an embodiment of the invention, the term of said information relating to a transfer time via said route to the upstream node element is obtained from a measurement of a data propagation time from the intermediate node element to an upstream node element according to the following substeps:
    sending of a measurement request to the upstream node element, said request comprising an indication of an input port and of an output port of said intermediate node element for said measurement;
    on reception of a positive response message from the upstream node element, initiation of the measurement by sending a probe-type signal from the indicated output port to the upstream node element; and
    stopping of the measurement on reception of the probe-type signal by the intermediate node element on the indicated input port.

Such a measurement can be made in the transfer plane and/or in the control plane. It makes it possible to obtain, in a simple way, an accurate estimation of a propagation time over an optical link between a node element and one of its neighbors. One advantage of this measurement is that, once the adjacent node element has configured its input and output ports, the measurement is made transparently, at the optical level and without intervention on its part.

Another advantage of the measurement is that, because the adjacent node does not intervene, it is really the outbound-return propagation time over the optical link that is obtained, without processing times. All that is needed is to halve the value obtained to have a simple propagation time.

It will be noted that, when the transfer time comprises a term relating to the request or data propagation time, the step for updating said information can advantageously be carried out before or after the computation of the reservation start time depending on the method by which the transfer time is obtained. As an example, if the transfer times are obtained by the preceding measurement and transmitted to the downstream node element in the request, the order of the steps will be imposed by the content of the information relating to the transfer time contained in the request. In other words, if the second parameter contains the measurement of the transfer time over the optical link between the upstream node element and the intermediate node element, the computation can be done before the update, otherwise the reverse will apply.

An embodiment of the invention also relates to a device for processing a delayed resource reservation request in an optical telecommunication network to transfer data between a source element and a destination element, the control plane being different from the transfer plane.

Such a device is particular in that, on reception by a node element of the network of the resource reservation request from the source element and addressed to the destination element via a route including at least one node element, said request comprising at least one first parameter relating to a start of the connection at the source element, said device is suitable for implementing the following means:
    obtaining of information relating to a transfer time via said route to an upstream node element,
    updating of said information by adding a transfer time at said intermediate element, and
    computation of a resource reservation start time at the node element based on the value of said parameter received and said information obtained.

Advantageously, on reception of a measurement request from a neighboring node element, said device is suitable for implementing the following means:
    identification of an input port and an output port in the measurement request;
    loop control of the identified input port and output port;
    sending of an acknowledgement message to the neighboring node element.

Such a device is therefore suitable for responding to a transit time measurement request from a neighboring node element.

One advantage is to measure a request or data propagation time directly on the physical layer of the telecommunication network, by using the node elements transparently, that is to say, without translating the probe-type optical signal into an electronic signal.

An embodiment of the invention also relates to a node element of a telecommunication network suitable for transferring data from a source element and addressed to a destination element, both connected to said network, characterized in that it comprises a delayed resource reservation device according to an embodiment of the invention.

Such a node element can receive the request from another node element of the network or else from an element connected to the network such as a client terminal element.

An embodiment of the invention also relates to an optical telecommunication network suitable for transmitting data between a source element and a destination element via at least one intermediate node element of said network, characterized in that said node element comprises a delayed resource reservation device according to an embodiment of the invention.

In one particular embodiment, the different steps of the delayed resource reservation method are determined by computer program instructions.

Consequently, an embodiment of the invention also targets a computer program on an information medium, this program being likely to be implemented in a node element or, more generally, in a computer, this program comprising instructions suitable for implementing the steps of a delayed resource reservation method as described above.

This program can use any programming language, and be in the form of source code, object code, or intermediate code between source code and object code, such as in a partially compiled form, or in any other desirable form.

An embodiment of the invention also targets an information medium that can be read by a computer, and comprising instructions of a computer program as mentioned above.

The information medium may be any entity or device capable of storing the program. For example, the medium may comprise a storage medium, such as a ROM, for example a CD ROM or a microelectronic circuit ROM, or even a magnetic storage means, for example a diskette or a hard disk.

Also, the information medium may be a transmissible medium such as an electrical or optical signal, which can be routed via an electric or optical cable, by radio or by other means. The program according to an embodiment of the invention can in particular be downloaded over an Internet-type network.

Alternatively, the information medium may be an integrated circuit in which the program is incorporated, the circuit being adapted to execute or to be used in the execution of the method concerned.

BRIEF DESCRIPTION OF THE DRAWINGS

Other advantages and features will become more clearly apparent on reading the following description of a particular embodiment of the invention, given merely as an illustrative and nonlimiting example, and from the appended drawings, in which.

DETAILED DESCRIPTION OF ILLUSTRATIVE EMBODIMENTS

The general principle of an embodiment of the invention relies on the reception of a network resource reservation request by a node element of the telecommunication network situated on a route chosen to set up a connection between a source element and a destination element and on the updating of this request based on the request processing time at the node element.

According to an embodiment of the invention, this request indicates at least the desired connection duration, a parameter relating to the start of the connection and a parameter relating to the aggregate processing time upstream of the current node. As a result, the current node element can deduce therefrom the modalities of the connection at its own level.

Hereinafter in the description, the case will be considered where the reservation of the resources at the determined times is performed on the passage of the reservation request message REQ or on the passage of the reception acknowledgement message AR. It will be understood that it is neither an outbound reservation nor a return reservation, but, indeed, a reservation that is delayed to the reservation time computed by the node according to an embodiment of the invention.

In the examples presented, an embodiment of the invention will be described in the distributed case, although it can also be applied to the centralized case.

Figure 3:
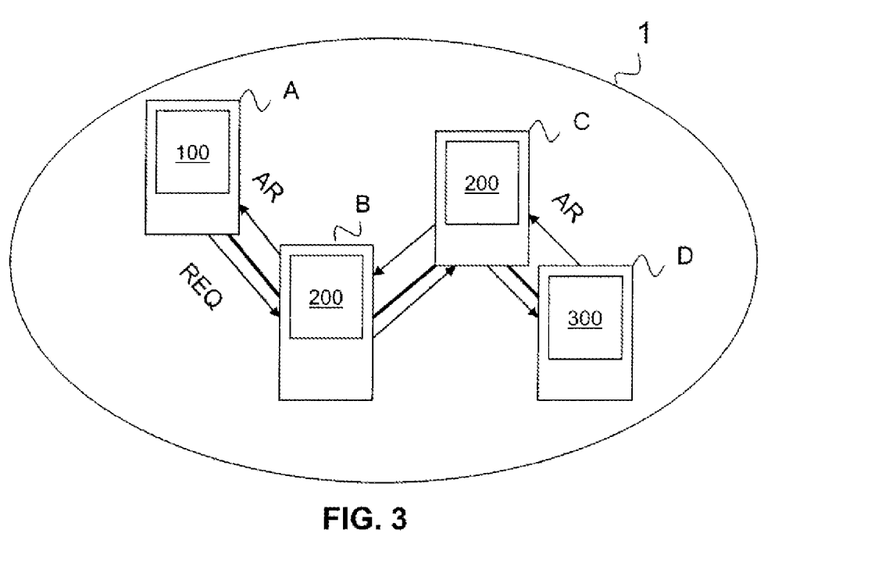
FIG. 3 schematically represents a circuit-switched optical telecommunication network according to an embodiment of the invention.

A telecommunication network 1 is presented in relation to FIG. 3 comprising a plurality of node elements A, B, C and D able to implement the delayed resource reservation method according to an embodiment of the invention. The case where the node element A, called source node, wants to set up a connection with the node element D, called destination element, is considered.

As is known, the node element A sends a signaling message comprising a reservation request to the destination element D.

Figure 4:
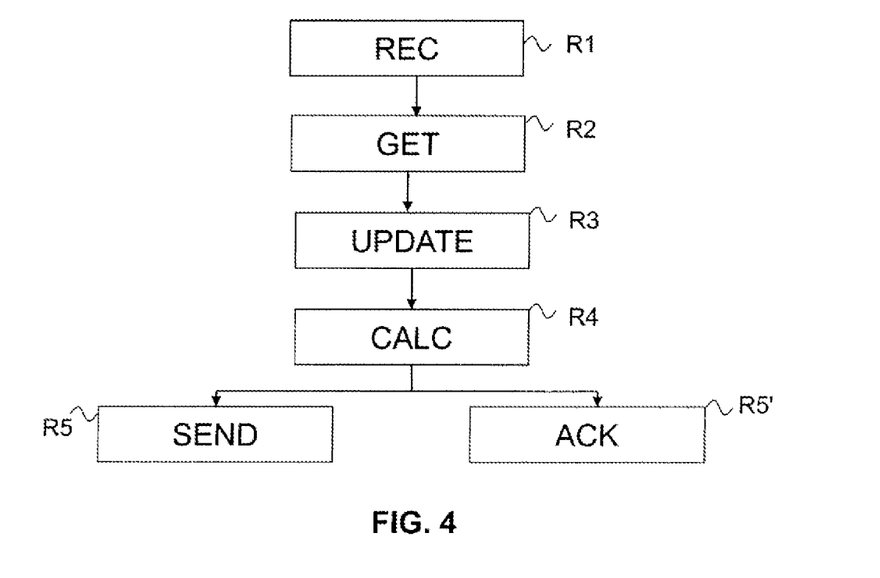
FIG. 4 schematically represents the steps of the delayed resource reservation method according to an embodiment of the invention.

On reception R1 of said request, a node element B, C of the route chosen to route the data from the source element A to the destination element D, is able to implement the delayed resource reservation method according to an embodiment of the invention, which will now be described in more detail in relation to FIG. 4.

The request REQ comprises at least one parameter relating to a start of the connection at the source element A. It may notably be a connection start time $t_c$ at the source element A or a waiting time $L_W$ before the start of the connection at the source element A.

In a step R2, information relating to a transfer time of a signal via said route to an upstream node element is obtained. Such information may comprise a term relating to an aggregate of processing times in the upstream node elements. It may also comprise a term relating to an aggregate of propagation times of the request between the node elements upstream of the intermediate node element in the control plane or even data in the transfer plane. Such information can be obtained by computation or by interrogating a database or even be received in a second parameter of the request REQ.

In a step R3, the information relating to a transfer time of the request REQ is updated to take into account the transfer time of the request between the output of the upstream node element and the output of the intermediate node element. It will therefore be understood that this update comprises obtaining the transfer time of the request at said intermediate element, for example by computation, then adding it to the value of said information.

In a step R4, a resource reservation start time ($tc_n$) is computed at the node element from the value of said first parameter (tc, Lw) received and from said information (LP, Lt, Lpt-corr) obtained. Such a computation may be based on the value, updated or not, of the information relating to the transfer time of a signal over the route ABCD.

When the node element is an intermediate node element, the method comprises a step R5 for sending the request REQ to the downstream node element over the route chosen for the transfer of the request.

When the node element is the destination element D, the method comprises a step R5' for sending a request reception acknowledgement message to the source element A over the same route in the reverse direction.

Regarding the choice of the connection start time at the source node element A, it will be noted that it can be made by the source node element A itself, at least on the basis of an estimation of a transfer time of the request REQ. Such an estimation can, for example, be done on the basis of the response times, that is to say, the times of reception of a request reception acknowledgment message by the destination node element, obtained over past connections. The important thing is to ensure that this choice allows the connection start time to be after the reception of the resource reservation reception acknowledgement message.

As a reminder, in a circuit-switched network, the connection is not set up until the source node element has received a positive reception acknowledgment in response to a resource reservation request. If the reception acknowledgement is negative, or if it is received after the proposed connection start time, the request (connection request) is "blocked", and another attempt can be made, if necessary, with new information relating to the connection start. In the latter case, it may be useful to take account of the transfer time of the blocked request to determine the new value of the information relating to the start of connection. If this duration is underestimated, the taking into account of the request at all the node elements of the route will not actually be finished before the connection start time (and the request will be blocked). If it is overestimated, there will be a waiting time before the connection is started up and therefore a loss of performance.

Figure 5:
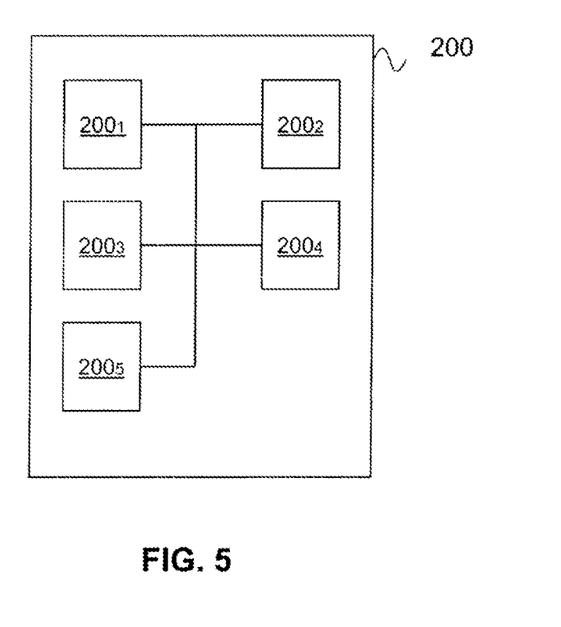
FIG. 5 represents the structure of a delayed resource reservation device according to an embodiment of the invention.

In the example described in relation to FIG. 3, the node elements B, C according to an embodiment of the invention comprise a delayed resource reservation device 200 which will be described in relation to FIG. 5. It comprises the hardware elements that are conventionally found in a conventional computer or a dedicated router, namely a processor $200_1$, a random-access memory RAM $200_2$, a read-only memory ROM $200_3$, telecommunication means $200_4$ with other devices of the node element such as a hardware platform (hardware) for example, consisting of FPGA-type components, able to insert timestamps in the signaling messages and means $200_5$ enabling telecommunications with the network.

Figure 6:
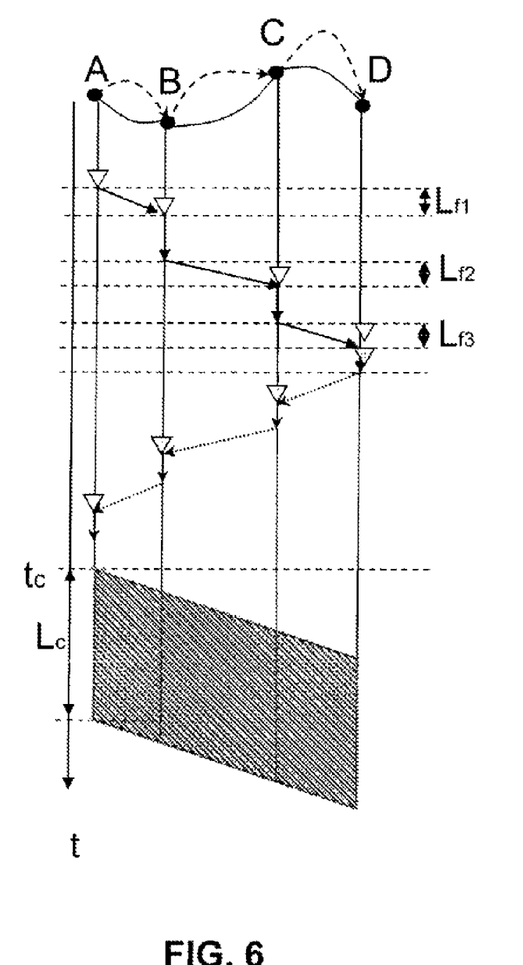
FIG. 6 illustrates an exemplary embodiment of the invention in the time-synchronized mode, when the signaling messages use an optical medium different from that of the data in the telecommunication network.

In relation to FIG. 6, an exemplary embodiment of the invention is presented in which the node elements of the telecommunication network 1 are in time-synchronized mode and the control plane and the transfer plane do not use the same optical fiber media. In this embodiment, it is assumed that a node knows the propagation times over the fibers from the transfer plane to its neighboring nodes. Advantageously, the times between the neighboring nodes are measured between these nodes using the optical propagation time measurement according to an embodiment of the invention.

Source Node Element A

The source node element A which initiates the connection (source, index 0) sends a signaling message comprising a resource reservation request to the node element B participating in the connection to the destination node element D. This request comprises the three parameters $L_c$, $t_c$ and $L_{p0}$, expressed as follows:
 the requested connection duration $L_c$;
 the connection start time at the first node $t_c$;
 the aggregate of the propagation times in the fibers of the transfer plane from the source element A: $L_{p0}=0$.

It will be noted that, in this embodiment, the optical propagation time measurement method is used.

According to an embodiment of the invention, the source node element A knows the time at which the connection will actually be active for it: this is the period running from the time $t_c$ to the time $t_c+L_c$.

Intermediate Node Element

The subsequent nodes will be required to modify the third parameter.

Assuming that, for a node element n of the connection:
 the parameter $L_p$ received in the message contains the value $L_{pn-1}$.

In this example, the node n updates the parameter $L_{pn-1}$ by adding $L_{fn}$ to obtain the parameter $L_p$ in which $L_{fn}$ is the propagation time over the optical fiber of the transfer plane between the node n and the node n−1. It will be noted that it will have been possible for the preceding node to directly send the value $L_{pn}$.

The node n can compute the time at which the connection will actually be active for it:
this is the period running from the time $t_c+L_{pn}$ to the time $t_c+L_{pn}+L_c$ with $L_{pn}=L_{pn-1}+L_{fn}$. This time is known to the node (optical measurement method).

The node element n can retransmit to the next node element n+1 the signaling message with the following information:
 the requested connection duration $L_c$;
 the connection start time at the first node $t_c$;
 the aggregate of the propagation times in the fibers of the transfer plane from the source element A: $L_{pn}$.

Destination Node

The destination node element D executes the same computations as the intermediate nodes, but does not retransmit the parameters $L_c$, $t_c$ and $L_{pn}$ in a reservation request (last node). If necessary, it transfers a reception acknowledgement message to the node C toward the node A.

In relation to FIG. 6, an exemplary embodiment of the invention is presented in which the node elements of the telecommunication network 1 are in time-synchronized mode and the control plane and the transfer plane do not use the same optical fiber medium. In this embodiment, it is assumed that all the propagation times over all the fibers of the transfer plane are known to all the nodes (for example: the times between the neighboring nodes are measured between these nodes by using the optical propagation time measurement method described later in this document, and an automatic discovery protocol is used to distribute these times to each node of the network).

Source Node Element A

The source node element A which initiates the connection (source, index 0) sends a signaling message comprising a resource reservation request to the node element B participating in the connection toward the destination node element D. This request comprises only two parameters $L_c$, $t_c$, expressed as follows:

the requested connection duration $L_c$;
the connection start time at the first node $t_c$.

It will be noted that, in this embodiment, the optical propagation time measurement method is used.

According to an embodiment of the invention, the source node element A knows the time at which the connection will actually be active for it: this is the period running from the time $t_c$ to the time $t_c+L_c$.

Intermediate Node Element

The subsequent nodes do not have to modify the two parameters received.

The node n can compute the time at which the connection will actually be active for it: this is the period running from the time $t_c+L_p$, to the time $t_c+L_{pn}+L_c$ with $L_{pn}=L_{f1}+L_{f2}+\ldots+L_{fn}$, where $L_{fn}$ is the propagation time over the fiber of the transfer plane between the node n and the node n−1. These times are known to the node.

The node element n can retransmit to the subsequent node element n+1 the signaling message with the following information, unchanged:

the requested connection duration $L_c$;
the connection start time at the first node $t_c$.

Destination Node

The destination node element D executes the same computations as the intermediate nodes but does not retransmit the parameters $L_c$ and $t_c$ in a reservation request (last node). If necessary, it transfers a reception acknowledgement message to the node C toward the node A.

In the preceding examples, it was assumed that the node elements had clocks that were mutually synchronized in time with a sufficient precision, of the order of a microsecond.

Such a time synchronization of the nodes, if possible, is expensive with the solutions currently available to achieve the required precision (GPS being the only solution available today to achieve the μs) or else does not provide sufficient precision with other protocol methods as currently available. It will be noted that works are currently underway (although not finalized for the time being) with a view to allowing the transfer of time synchronization by the network with a precision that could approach that required by an embodiment of the invention in its synchronized mode embodiment.

In case of poor synchronization between the clocks of the nodes, it is necessary to take margins on the reservation which reduces performance. The simulations show that, beyond 1 μs of margins, therefore when the precision of the time reference common to the nodes exceeds 1 μs, performance rapidly degrades (in the case where the duration of the connections is 1 ms on average).

To improve the situation, it will be understood that it is essential to provide a particular processing for the networks which are not, or are poorly, synchronized in time.

The case is therefore considered in which the node elements of the telecommunication network 1 are not synchronized in time. They therefore do not have access to a common time reference. They may possibly be synchronized in frequency (therefore have access to a common reference frequency), or else be asynchronous, but have access to a time base in free mode.

It will also be noted that the embodiment of the invention intended for the nodes not synchronized in time also applies to the nodes that are synchronized in time. In this case, it allows cases of networks that are synchronized heterogeneously to work: for example in the cases where the primary source of synchronization in time is not made in the same way between the different domains (for example, between elements of different operators), or else the cases where only a part of the network is synchronized in time.

Unlike the preceding cases in which the nodes were synchronized in time, the knowledge of the time of the start of the connection at the first node cannot be used by the intermediate nodes since the nodes do not have access to a common time reference. Instead, the source node element initiating the connection indicates in a parameter of the request REQ how much time it will take for the connection to start, from the instant of sending of the first request signaling message by the first node. In other words, it indicates a waiting time before the start of the connection at the first node instead of a connection start time at the first node. The waiting time $L_w$ before the start of connection from the instant of sending of the first signaling message by the first node is proposed by the source node element initiating the connection. It has to be appropriate relative to the signaling time (see explanations above).

Figure 7:
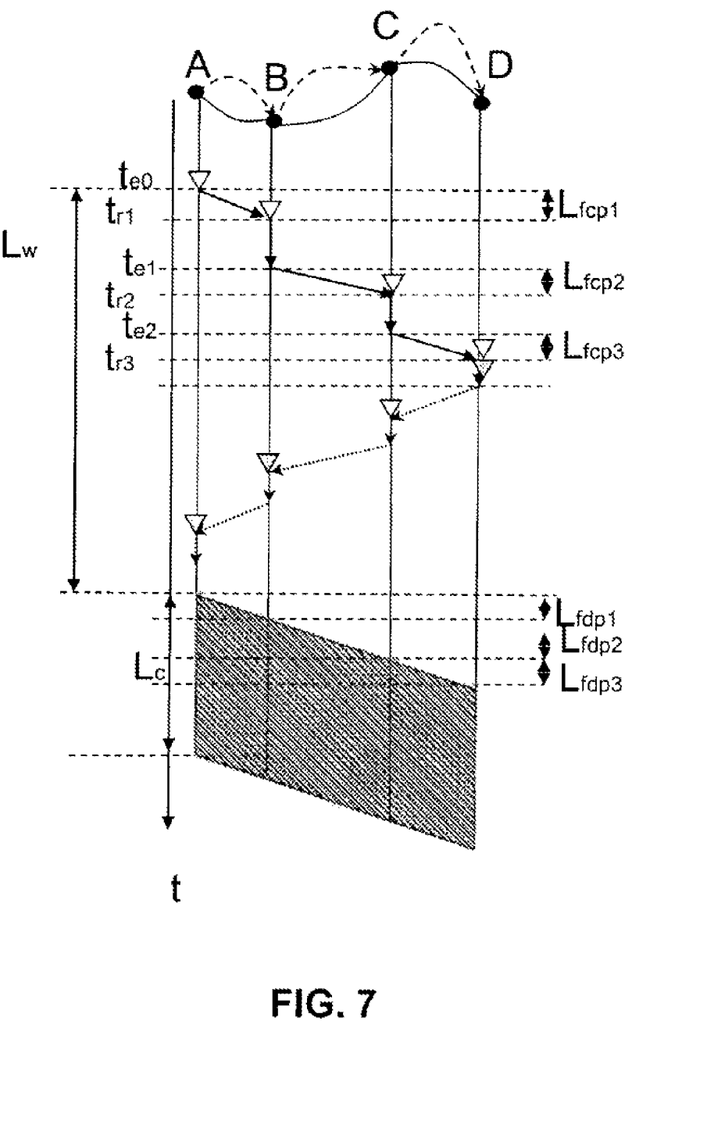
FIG. 7 illustrates an exemplary embodiment of the invention in the non-time-synchronized mode, when the signaling messages use an optical medium different from that of the data in the telecommunication network.

An exemplary embodiment of the invention is presented in relation to FIG. 7 in which the node elements of the telecommunication network 1 are in non-time-synchronized mode and the control plane and the transfer plane do not use the same optical fiber medium. It is assumed in this example that each node element computes its processing time (variable from one message to another and from one node to another) for the request signaling message, and indicates to the next node element, in the signaling message, that it is transmitting to it the aggregate of the processing times aggregated since the first node element A, corrected by the propagation differences between the links of the control plane and of the transfer plane.

The three parameters exchanged between the nodes are as follows:

the requested connection duration $L_c$;
the waiting time before the start of connection from the instant of sending of the first signaling message by the first node $L_w$;
the aggregate processing time in the upstream node elements corrected by the propagation differences between the links of the control plane and of the transfer plane $L_{pt\text{-}corr}$.

Using this duration, each node can deduce its local connection start time. In fact, each node considers a virtual connection start time if the processing times were zero, which corresponds to the time of reception of the message plus the aggregate processing times. This duration is corrected with the transit differences between the optical fibers of the control plane and those of the transfer plane. This correction enables the next node to correct its reception time: the new "virtual" time is the time at which the message would have been received if the transit times in the control plane and the transfer plane had been identical (this is therefore tantamount to the preceding case).

Hereinafter, $L_{fcpn}$ and $L_{fdpn}$ will be used to designate the values of the transit times over the fiber on the control plane and the transfer plane respectively, between the nodes n and n+1.

It will be noted that, in this embodiment, the optical propagation time measurement method is used in the control and transfer planes.

Source Node

The node which initiates the connection (source, index 0) sends a signaling message to the nodes participating in the connection, containing the following information:

the requested connection duration ($L_c$);

the waiting time before the start of the connection $L_w$;

the aggregate processing time corrected with the transit time difference between the fiber of the control plane and that of the transfer plane. At the source node, the processing time is not counted, $L_{pt\text{-}corr}$ is therefore initialized with $L_{fcp0} - L_{fdp0}$.

As a variant, the values $L_{fcp0} - L_{fdp0}$ of the parameter $L_{pt\text{-}corr}$ can be updated by the next node.

The source node can compute the local time at which the connection will be effectively active for it:

this is the period running from the time $t_{e0} + L_w$ to the time $t_{e0} + L_w + L_c$.

Intermediate Node

The subsequent nodes will be required to modify the third parameter.

Assuming that, for a node n of the connection:

the signaling message is received at the time $t_m$;

the signaling message is retransmitted to the node n+1 at the time $t_{en}$;

the parameter $L_{pt\text{-}corr}$ received in the message contains the value $L_{pt\text{-}corr\text{-}n\text{-}1}$.

The node n computes the time at which the connection will effectively be active for it:

this is the period running from the time $t_{rn} + L_w - L_{pt\text{-}corr\text{-}n\text{-}1}$ to the time $t_{rn} + L_w - L_{pt\text{-}corr\text{-}n\text{-}1} + L_c$.

The node n retransmits to the next node n+1 the signaling message updated with the following information:

the requested connection duration Lc;

the waiting time Lw;

the processing time aggregated from the first node $L_{pt\text{-}corr} = L_{pt\text{-}corr\text{-}n} = L_{pt\text{-}corr\text{-}n\text{-}1} + t_{en} - t_{rn} + L_{fcpn} - L_{fdpn}$.

Destination Node

The destination node D executes the same computations as the intermediate nodes but does not retransmit the request signaling message (last node). If necessary, it transfers a reception acknowledgment message to the upstream nodes addressed to the source element A.

In a similar embodiment, the corrections made on the aggregate processing times with the propagation time differences between the links of the control plane and of the transfer plane can be made in the nodes on the basis of their knowledge of the fiber times of all the links of the network. In this case, the parameter $L_{pt\text{-}corr}$ is updated only with the aggregate processing times.

Note: an alternative to the preceding embodiment is possible by considering that the processing times of the signaling messages in the node elements are imposed in each of the node elements of the control plane. It will be noted that this embodiment is technically more complex to implement than the first. In this embodiment:

each node participating in the connection has to know the processing times imposed in all the preceding nodes from the first node of the connection;

each node participating in the connection has to be able to determine the aggregate of the propagation times on the fibers in the control plane from the first node (possibly based on the knowledge of all the fiber times of the control plane);

each node participating in the connection has to be able to determine the aggregate of the propagation times over the fibers in the transfer plane from the first node (possibly based on the knowledge of all the fiber times of the transfer plane).

Figure 8:
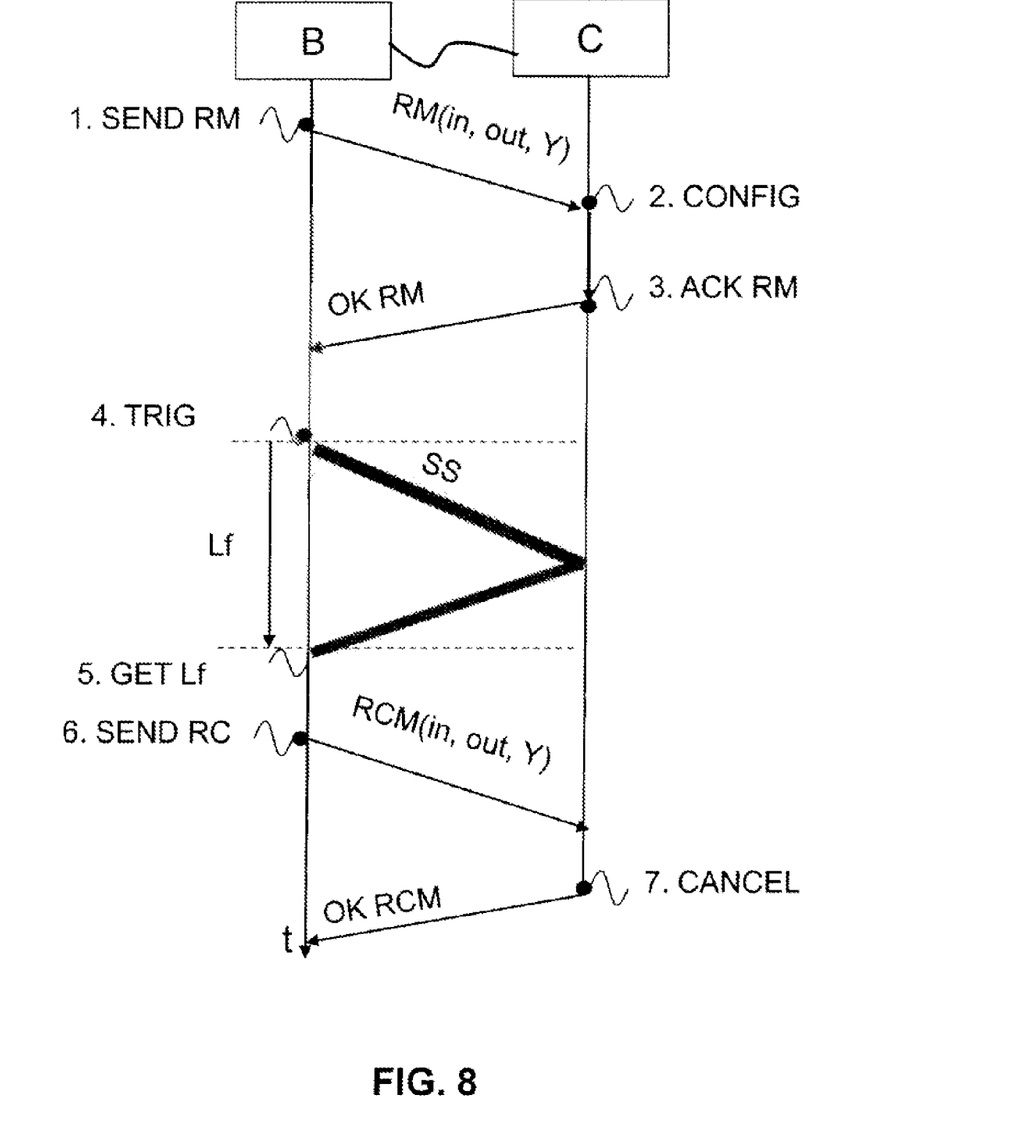
FIG. 8 illustrates an embodiment of a measurement of a propagation time of a signal between a node element and a neighboring node element according to one aspect of the invention.

In relation to FIG. 8, there now follows a description of an exemplary measurement of a transit time $L_f$ in an optical link linking the node element n according to an embodiment of the invention to one of its neighbors in the telecommunication network 1. As stated previously, the measurement which will be described can be implemented by the node element, either following a reservation request, or prior to the reception and processing of such a request. It can also be renewed regularly.

The principle of such a measurement will now be described. It is assumed that the node element n and its neighbor n+1 have knowledge of the optical links which link them, for example by using a protocol of link management type (LMP, Link Management Protocol). The node elements n and n+1 concerned conventionally comprise an optical controller suitable for controlling the sending of optical signals over one of said optical links.

In a first step, the node element n sends a signaling message to the node element n+1 comprising a propagation time measurement request RM. Such a request comprises an indication of an output port out via which the node element n will send a measurement signal and an input port in on which the node element n wants to receive the measurement signal in return. It also indicates to which input port Y of the element n+1 the node element n will send its measurement signal.

On reception of this request, the node element n+1 configures, on its optical switch, a loop between the port Y and an output port X suitable for directly transferring the response measurement signal.

In a third step, it sends to the node element n a reception acknowledgement signaling message OK RM indicating that it is ready for the measurement.

In a fourth step, the node element n initiates the measurement by ordering its optical controller to send a probe-type optical signal to the port Y of the node element n+1 and to wait for a response signal. Such a probe-type signal may be a simple sinusoid; it is not necessary to send a coded digital sequence.

At the destination node element n+1, no specific action is required for this measurement, because, because of the optical loop between the input Y and output X ports, the probe-type signal is redirected to the port in of the element n transparently for the node n+1.

At the instant of reception of the return probe signal SS, the node element n stops the measurement and records the measured transit time $L_f$.

Advantageously, the node element n can release the resources engaged at the element n+1 by sending it a signaling message indicating the end of the measurement.

It will be understood that the times obtained are dependent solely on the accuracy of the clock of the node element n which initiates the measurement. Since the propagation times over the links of an optical telecommunication network are of the order of ten or so milliseconds for the round-trip time, and the stability of a clock is estimated at least 20 ppm, the accuracy of this type of measurement is therefore of the order of 200 nanoseconds (ns) for 10 ms of delay and 20 ns for 1 ms (0.002%). It may therefore be useful for the network to be synchronized in frequency, in order to improve the accuracy of these measurements.

The invention claimed is:

1. A method for processing a resource reservation request in an optical telecommunication network to transfer data through a connection between a source node element and a destination node element, the network having a control plane that is different from a transfer plane, wherein the method comprises the following steps, in response to reception by a node element of the network of the resource reservation request from the source node element and addressed to the destination node element via a route including at least one intermediate node element, said resource reservation request comprising at least one first parameter relating to a start of the connection at the source node element:

obtaining information relating to a transfer time of a signal via said route to an upstream node element along the route, updating said information by adding a transfer time of a signal at said intermediate node element, and computing a resource reservation start time at the node element that received the resource reservation request, based on the value of said first parameter received and said information.

2. The method for processing a reservation request as claimed in claim 1, wherein the information relating to a transfer time is obtained in a second parameter of the received request.

3. The method for processing a reservation request as claimed in claim 2, wherein, when the node element is an intermediate node element, said method comprises a step of sending the request to a downstream node element on said route, said request comprising the updated value of said information in the second parameter.

4. The method for processing a reservation request as claimed in claim 1, wherein, when the source, destination and intermediate node elements of the network are synchronized in time, the first parameter comprises a resource reservation start time for the source node element and the step of computing a resource reservation start time at the node element comprises addition of the value of said information and of the value of said resource reservation start time for the source node element.

5. The method for processing a reservation request as claimed in claim 1, wherein, when the source, destination and intermediate node elements of the network are not synchronized in time, the first parameter comprises a waiting time before a resource reservation start time and the step of computing a resource reservation start time at the node element comprises subtraction of the value of said information from a time of reception of the request by the intermediate node element plus the value of the first parameter.

6. The method for processing a reservation request as claimed in claim 1, wherein the information relating to a transfer time comprises a term relating to an aggregate of data propagation times via said route to the upstream node element; and the updating of said information comprises an addition of a propagation time between the upstream node element and the intermediate node element to the received value of said parameter.

7. The method for processing a reservation request as claimed in claim 6, wherein said term of said information comprises a difference between an aggregate of the propagation times of the request and the aggregate of the propagation times of the data to the upstream node element.

8. The method for processing a reservation request as claimed in claim 6, wherein the term of said information relating to a transfer time of a signal via said route to the upstream node element is obtained from a measurement of a data propagation time from the intermediate node element to an upstream node element according to the following sub-steps:

sending of a measurement request to the upstream node element, said measurement request comprising an indication of an input port and of an output port of said intermediate node element for said measurement;

on reception of a positive response message from the upstream node element, initiation of the measurement by sending a probe-type signal from the indicated output port to the upstream node element; and stopping of the measurement on reception of the probe-type signal by the intermediate node element on the indicated input port.

9. A device for processing a resource reservation request in an optical telecommunication network to transfer data through a connection between a source node element and a destination node element, the network having a control plane that is different from a transfer plane, wherein the device comprises the following means, which are implemented in response to reception by a node element of the network of the resource reservation request from the source node element and addressed to the destination node element via a route including at least one intermediate node element, said resource reservation request comprising at least one first parameter relating to a start of the connection at the source node element:

means for obtaining information relating to a transfer time of a signal via said route to an upstream node element, means for updating said information by adding a transfer time of a signal at said intermediate node element, and means for computing a resource reservation start time at the node element that received the resource reservation request, based on the value of said first parameter received and said information obtained.

10. The device as claimed in claim 9, wherein the device comprises the following means, which are implemented on reception of a measurement request from a neighboring node element:

means for identification of an input port and an output port in the measurement request;

means for loop control of the identified input port and output port;

means for sending an acknowledgement message to the neighboring node element.

11. A node element of a telecommunication network suitable for transferring data from a source node element and addressed to a destination node element, both connected to said network, wherein the node element comprises the device for processing a reservation request as claimed in claim 9.

12. An optical telecommunication network suitable for transmitting data between a source node element and a destination node element via at least one intermediate node element of said network, wherein said intermediate node element comprises the device for processing a reservation request as claimed in claim 9.

13. A non transitory computer-readable medium device comprising a computer program product stored thereon, wherein the product comprises program code instructions for executing a method for processing a resource reservation request in an optical telecommunication network to transfer data through a connection between a source node element and a destination node element, the network having a control plane that is different from a transfer plane, wherein the method comprises the following steps, in response to reception by a node element of the network of the resource reservation request from the source node element and addressed to the destination node element via a route including at least one intermediate node element, said resource reservation request comprising at least one first parameter relating to a start of the connection at the source node element:
- obtaining information relating to a transfer time of a signal via said route to an upstream node element along the route,
- updating said information by adding a transfer time of a signal at said intermediate node element, and
- computing a resource reservation start time at the node element that received the resource reservation request, based on the value of said first parameter received and said information.

* * * * *